United States Patent [19]
De Oliveira et al.

[11] Patent Number: 5,242,874
[45] Date of Patent: Sep. 7, 1993

[54] PROCESS FOR WHITENING KAOLIN

[75] Inventors: Fabio M. De Oliveira; Nilce Ortiz, both of Sao Paulo, Brazil

[73] Assignee: Alcoa Aluminio S.A., Sao Paulo, Brazil

[21] Appl. No.: 511,416

[22] Filed: Apr. 20, 1990

[51] Int. Cl.⁵ .............................................. C04B 33/10
[52] U.S. Cl. .................................... 501/146; 501/149; 162/181.8
[58] Field of Search ............... 501/145, 146, 147, 149; 106/488; 162/181.8

[56] References Cited
FOREIGN PATENT DOCUMENTS 8702121 11/1988 Brazil .
8705550  5/1989 Brazil .

Primary Examiner—Mark L. Bell
Assistant Examiner—Chris Gallo
Attorney, Agent, or Firm—Daniel A. Sullivan, Jr.; Felix J. D'Ambrosio; John P. Foryt

[57] ABSTRACT

The present invention refers to a process for whitening kaolinitic clays by adding an aqueous acid solution containing sodium bisulfite and atomized aluminum powder, thereby causing the reduction of the contaminating iron ions present in the kaolin, resulting in a considerable increase in its whiteness index as well as a reduction of the particle size of the product obtained.

14 Claims, No Drawings

PROCESS FOR WHITENING KAOLIN

BACKGROUND OF THE INVENTION

1. Field of the Invention

The present invention relates to a process for whitening kaolin which permits the obtention of higher indices of whiteness and a reduction in the size of the particles of the kaolin product obtained.

2. Description of Previously Existing Technology

As is widely known in the field, kaolin is the term generally used to designate a material essentially consisting of clay minerals of the kaolinite group ($Al_2O_3 \cdot 2SiO_2H_2O$), i.e., a silicate of hydrated aluminum.

Geologically, kaolins appear in the form of an extremely fine powder, resulting from the weathering of feldspathic rocks, the primary economically exploitable deposits of which originated in primary kaolinization in situ of rocks containing high concentrations of feldspathic minerals (primary kaolins), or arising from being borne along by river or lake freshwater currents, with subsequent settling and selection of primary kaolins associated with other minerals such as quartz or mica (secondary kaolins).

Owing to their characteristics of good chemical inertness and fine particle size, in addition to their generally white color, their broad availability and low costs, kaolins are widely used industrially as fillers or coating materials for paper, ceramics, inks, rubbers, plastics and fertilizers, among other substances.

One problem with kaolins, however, is the presence of iron and titanium oxides, which alter their white color—one of their most important characteristics. The content and forms in which the contaminating oxides are present vary according to the origin of the kaolin.

Innumerable solutions have been previously proposed to improve kaolins, aimed at removing the contaminating iron oxide in order to whiten kaolins. Diverse whitening processes using different reagents are described, for instance, in the text "Clays and Clay Minerals—Proceedings of the Seventh National Conference on Clays and Clay Minerals," Washington, D.C., October 1988, pages 317 and 327, the text of which is included herewith as a reference.

Among these well-known processes, the most widely used are leaching the kaolin with an acid solution containing sodium dithionite ($Na_2S_2O_4$) or a mixture of sodium bisulfite and metallic zinc ($NaHSO_3/Zn^o$).

For the specific case of Brazilian kaolinitic clays, which are principally darkened by the presence of high concentrations of goethite (FeOOH), however, the use of these aforementioned reagents is not sufficient to provide the whiteness required for certain applications of kaolin.

In fact, laboratory experiments have shown that leaching samples of goethite with acid solutions containing the above-mentioned reagents resulted in dissolving or eliminating from 12.5 to 18.7% of the iron contained in the sample, which is low for obtaining the higher values of whiteness.

Therefore, there exists a need for a process for whitening kaolin, which, by means of dissolving greater amounts of iron in kaolin, will make it possible to obtain greater values of whiteness.

SUMMARY OF THE INVENTION

The present invention is directed toward solving the aforesaid problems with the previously existing technology by providing a process for whitening kaolin which makes it possible to obtain greater values of whiteness.

According to the present invention, these objectives are attained by providing a process for whitening kaolin containing contaminating iron and titanium oxides characterized by the fact that it includes:

treating the kaolin with an aqueous acid solution containing sodium bisulfite and atomized aluminum powder; and washing the treated kaolin in order to remove the reacted contaminants.

The process for whitening kaolinitic clays according to the present invention includes as an essential feature the stage of leaching out the iron and titanium oxides contained therein by means of an aqueous acid solution containing sodium bisulfite ($NaHSO_3$) and atomized aluminum powder (Al). The reaction between the sodium bisulfite and the aluminum powder and the iron contained in the kaolin in the form of contaminating iron oxide causes the reduction and consequent actual and effective elimination of the iron ions present in the clay.

According to one of the embodiments of the process of the present invention, the aluminum powder (Al) is previously dissolved in hydrochloric acid (HCl) to remove the film of aluminum oxide ($Al_2O_3$) naturally formed around it, thereby increasing its reactivity, whereby its reactive capacity for providing $S_2O_4[=]$ is substantially increased, because of which the reduction and removal of greater quantities of iron from the kaolin takes place.

After this prior aluminum treatment of the sodium bisulfite/aluminum powder system, the pH of the treatment system is then adjusted to a value of from 2 to 5 to provide the acid treatment solution. The adjustment of the pH can be performed with the same HCl used in the prior aluminum treatment, as well as with other acids to adequately perform this function, such as, for example, sulfuric acid.

The concentration of sodium bisulfite in acid treating solutions may vary within a range of around 0.1 to 9.0% by weight, as the concentrations of aluminum powder and acid (preferably hydrochloric or muriatic acid) may vary, respectively, in ranges from around 0.1% to 2% by weight and 1.8% to 18% by weight.

After having been subjected to leaching, the kaolin is washed to separate out the reacted contaminants. The washing may be done with water or preferably with water containing phosphoric acid, $H_3PO_4$. The concentration of phosphoric acid in the washing solution may vary from around 0.2% to 4.4% by weight.

The process of treating kaolin contemplated in the present invention may be performed in temperatures varying within a range of around 15° C. to around 25° C. at atmospheric pressure or at pressures approximating atmospheric pressure.

In addition to providing for the obtention of kaolin with higher indices of whiteness, the process of the invention possesses the additional advantage of reducing the size of the kaolin particles obtained, whereby, for example, in the manufacture of paper, there is a superior adaptation of the kaolin to the paper fibers.

The present invention will be described below in greater detail with reference to the illustrative examples listed below, wherein a kaolin from the region of the Paraiba Valley (State of Sao Paulo) was used which had an initial whiteness value of 62.7%.

EXAMPLE 1

40 grams of kaolin were leached for 30 minutes with an acid solution containing 2 grams of sodium dithionite ($Na_2S_2O_4$) dissolved in 200 ml of 8M hydrochloric acid with a pH value of 2.0. The kaolin thus treated was then filtered, washed three times and immediately dried in a kiln at 60° C. The whiteness value produced is indicated in Table I.

EXAMPLE 2

40 grams of kaolin were leached for 30 minutes with an acid solution containing 2 grams of sodium dithionite ($Na_2S_2O_4$) dissolved in 200 ml of 8M hydrochloric acid with a pH value of 2.5. The kaolin thus treated was then filtered, washed three times and immediately dried in a kiln at 60° C. The whiteness value produced is indicated in Table I.

EXAMPLE 3

40 grams of kaolin were leached for 30 minutes with an acid solution containing 2 grams of sodium dithionite ($Na_2S_2O_4$) dissolved in 200 ml of 8M hydrochloric acid with a pH value of 3.0. The kaolin thus treated was then filtered, washed three times and immediately dried in a kiln at 60° C. The whiteness value produced is indicated in Table I.

EXAMPLE 4

40 grams of kaolin were leached for 30 minutes with an acid solution containing 2.4 grams of sodium bisulfite ($NaHSO_3$) and 0.8 grams of zinc (Zn) dissolved in 200 ml of 8M hydrochloric acid with a pH value of 2.0. The kaolin thus treated was then filtered, washed three times and immediately dried in a kiln at 60° C. The whiteness value produced is indicated in Table I.

EXAMPLE 5

40 grams of kaolin were leached for 30 minutes with an acid solution containing 2.4 grams of sodium bisulfite ($NaHSO_3$) and 0.8 grams of zinc (Zn) dissolved in 200 ml of 8M hydrochloric acid with a pH value of 2.5. The kaolin thus treated was then filtered, washed three times and immediately dried in a kiln at 60° C. The whiteness value produced is indicated in Table I.

EXAMPLE 6

40 grams of kaolin were leached for 30 minutes with an acid solution containing 2.4 grams of sodium bisulfite ($NaHSO_3$) and 0.8 grams of zinc (Zn) dissolved in 200 ml of 8M hydrochloric acid with a pH value of 3.0. The kaolin thus treated was then filtered, washed three times and immediately dried in a kiln at 60° C. The whiteness value produced is indicated in Table I.

EXAMPLE 7

40 grams of kaolin were leached for 30 minutes with an acid solution containing 2.4 grams of sodium bisulfite ($NaHSO_3$) and 0.3 grams of aluminum (Al), previously treated with HCl, dissolved in 200 ml of 8M hydrochloric acid with a pH value of 2.0. The kaolin thus treated was then filtered, washed three times and immediately dried in a kiln at 60° C. The whiteness value produced is indicated in Table I.

EXAMPLE 8

40 grams of kaolin were leached for 30 minutes with an acid solution containing 2.4 grams of sodium bisulfite ($NaHSO_3$) and 0.3 grams of aluminum (Al) previously treated with HCl, dissolved in 200 ml of 8M hydrochloric acid with a pH value of 2.5. The kaolin thus treated was then filtered, washed three times and immediately dried in a kiln at 60° C. The whiteness value produced is indicated in Table I.

EXAMPLE 9

40 grams of kaolin were leached for 30 minutes with an acid solution containing 2.4 grams of sodium bisulfite ($NaHSO_3$) and 0.3 grams of aluminum (Al), previously treated with HCl, dissolved in 200 ml of 8M hydrochloric acid with a pH value of 3.0. The kaolin thus treated was then filtered, washed three times and immediately dried in a kiln at 60° C. The whiteness value produced is indicated in Table I.

In the additional examples provided below, the process of the present invention was performed substantially as above, except that the pure 8M hydrochloric acid used in the system's prior treatment of the aluminum was replaced by industrial hydrochloric acid, commonly known as muriatic acid, in the same concentration, without the greater content of impurities contained therein affecting the embodiment of the process of the present invention. Examples 10 through 12 are illustrative of this embodiment of the invention.

EXAMPLE 10

40 grams of kaolin were leached for 30 minutes with an acid solution containing 2.4 grams of sodium bisulfite ($NaHSO_3$) and 0.3 grams of aluminum (Al) dissolved in 200 ml of 8M muriatic acid with a pH value of 2.0. The kaolin thus treated was then filtered, washed three times and immediately dried in a kiln at 60° C. The whiteness value produced is indicated in Table I.

EXAMPLE 11

40 grams of kaolin were leached for 30 minutes with an acid solution containing 2.4 grams of sodium bisulfite ($NaHSO_3$) and 0.3 grams of aluminum (Al) dissolved in 200 ml of 8M muriatic acid with a pH value of 2.5. The kaolin thus treated was then filtered, washed three times and immediately dried in a kiln at 60° C. The whiteness value produced is indicated in Table I.

EXAMPLE 12

40 grams of kaolin were leached for 30 minutes with an acid solution containing 2.4 grams of sodium bisulfite ($NaHSO_3$) and 0.3 grams of aluminum (Al) dissolved in 200 ml of 8M muriatic acid with a pH value of 3.0. The kaolin thus treated was then filtered, washed three times and immediately dried in a kiln at 60° C. The whiteness value produced is indicated in Table I.

The values of whiteness obtained were ascertained according to the ISO 2470 standard, using an Elrepho measuring device equipped with a 457 filter.

Examples 1 through 6 are illustrative of tests performed using a leaching process as it is known in the field (dithionite+HCl (examples 1-3) and sodium bisulfite+Zn+HCl (examples 4-6)) and were shown only for purposes of reference and comparison with the results obtained by process of the present invention.

As can be seen in Table I, the leaching performed by the sodium bisulfite/aluminum system of the present invention proves more efficient both in relation to dissolving the goethite and with regards to the whiteness obtained in the chemically treated kaolin.

TABLE I

| Example | Whiteness Value (%) |
| --- | --- |
| 1 | 73.50 |
| 2 | 69.45 |
| 3 | 68.45 |
| 4 | 79.15 |
| 5 | 67.30 |
| 6 | 60.80 |
| 7 | 81.37 |
| 8 | 81.10 |
| 9 | 81.42 |
| 10 | 81.70 |
| 11 | 82.30 |
| 12 | 81.80 |

Another result observed after the treating the kaolin with the process of the present invention is that it becomes finer, thus providing an additional advantage for its subsequent use. In filtering the kaolin treated according to the present invention, it becomes necessary to use filter paper with smaller pores than those in the paper used for filtering kaolin treated by processes of the older technique.

For assessing the stability of the chemical treatment according to the process of the present invention, the kaolin was placed in a suspension with a pH value of 6.0, to which suspension a volume of hydrogen peroxide ($H_2O_2$) adequate for obtaining a potential of +60 mV was added. That value would be more than adequate to cause the $Fe^{2+}$ ions to revert to $Fe^{3+}$, which ions in a suspension with a pH of 6.0 would precipitate in the form of $Fe(OH)_3$, with a brown color, darkening the kaolin again.

The whiteness measurements performed after this assessment, however, showed that the whiteness value remained the same or in some cases increased slightly, due to the increase in the number of washings, mainly when this is done with $H_2O/H_3PO_4$, thus confirming the stability of the kaolin treated according to the present process.

The invention having been described, it should be understood that it may undergo countless modifications in its embodiments, provided that such modifications do not depart from the spirit or scope of the invention as described in the attached claims.

I claim:

1. A process for whitening kaolin containing an iron oxide contaminating agent, characterized by the fact that the following is comprised:
    treating the kaolin with an aqueous acid solution containing sodium bisulfite and atomized aluminum powder thereby producing reacted contaminants; and
    washing the treated kaolin with water containing phosphoric acid in a concentration of 0–4.4% in order to remove the reacted contaminants produced.

2. A process for whitening kaolin as claimed in claim 1, characterized by the fact that the washing stage comprises the washing of the kaolin in water containing 0.2–4.4% phosphoric acid.

3. A process for whitening kaolin as claimed in claim 1, characterized by the fact that sodium bisulfite is present in the aforementioned acid solution in a proportion of from 0.1% to 9.0% by weight based on the weight of the kaolin treated.

4. A process for whitening kaolin as claimed in claim 1, characterized by the fact that the atomized aluminum powder is present in the above-mentioned aqueous acid solution in a proportion of 0.1% to 2% by weight based on the weight of the kaolin treated.

5. A process for whitening kaolin as claimed in claim 1, characterized by the fact that the aluminum powder is subjected to a prior treatment with hydrochloric acid to increase its reactivity.

6. A process as claimed in claim 1, characterized by the fact that the pH of the solution during the treatment varies from around 2 to around 5.

7. A process as claimed in claim 1, 5 or 6, characterized by the fact that the pH during the treatment stage is adjusted to a range of from 2 to 5 through the use of HCl.

8. A process as claimed in claim 1, 5 or 6, characterized by the fact that the pH during the treatment stage is adjusted to a range of from 2 to 5 through the use of $H_2SO_4$.

9. A process as claimed in claim 1, 2, 3, 4, 5 or 6, characterized by the fact that it is performed at a temperature in a range of from around 15° C. to around 25° C. and at atmospheric pressure or at pressures approximating same.

10. A process as claimed in claim 1, 2, 3, 4, 5 or 6, characterized by the fact that the content of acid in the treatment solution varies from around 1.8% to 18% by weight.

11. A process comprising treating a material with a substance containing aluminum powder for solubilizing contaminating agents in the material and washing the material with water containing phosphoric acid in a concentration of 0–4.4% to remove the solubilized contaminating agents.

12. A process as claimed in claim 11, wherein the material comprises a mineral.

13. A process as claimed in claim 12, wherein the mineral comprises clay.

14. A process as claimed in claim 13, wherein the clay comprises kaolin.

* * * * *